Figure 1:
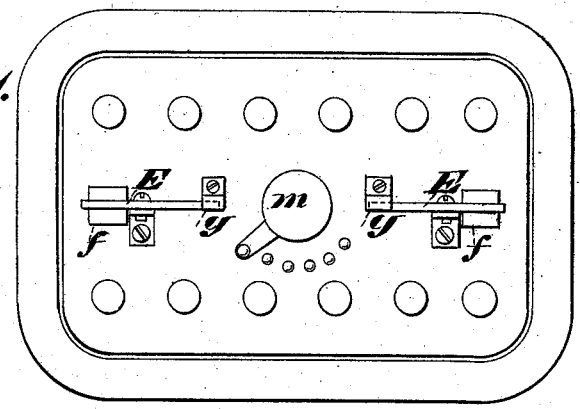

S. H. BARTLETT.
Portable Galvanic Battery.

No. 228,973.        Patented June 22, 1880.

Witnesses.
H. F. Parker.
Chas. H. Doxat.

Inventor.
Samuel H. Bartlett
per James A. Whitney
Atty.

N. PETERS, PHOTO-LITHOGRAPHER, WASHINGTON, D. C.

UNITED STATES PATENT OFFICE.

SAMUEL H. BARTLETT, OF NEW YORK, N. Y.

PORTABLE GALVANIC BATTERY.

SPECIFICATION forming part of Letters Patent No. 228,973, dated June 22, 1880.

Application filed January 23, 1880.

*To all whom it may concern:*

Be it known that I, SAMUEL H. BARTLETT, of the city, county, and State of New York, have invented an Improvement in Portable Galvanic Batteries, (Case B,) of which the following is a specification.

This invention is designed to provide a portable galvanic battery in which the exciting-liquid may be readily discharged from the battery-cell into a suitable reservoir, within which the battery-cell itself is placed.

The apparatus embracing the several combinations of my said invention is constructed as follows: A vessel, of suitable size and shape and of a material not liable to be corroded by the action of the exciting-liquid, has placed within it a battery-cell, so closely fitted that while capable of a vertical movement within the vessel, the passage of liquid between the cell and the interior surface of the said vessel is prevented, this being preferably insured by a suitable packing around the circumference of the cell. In the bottom of the cell are provided any desired number of holes or openings, preferably of conical form, and into which from beneath are fitted valves of corresponding shape. These valves are connected by rods, which extend upward to the top of the cell, and are there attached to operating-levers, by which the valves may be lowered away from the openings to open the latter or lifted to close the said openings, at will. The lower portion of the vessel, below the cell, is filled with the exciting-liquid intended for the use of the said cell. When it is desired to use the cell for battery purposes the valves are lowered away from the openings, and the cell itself is moved downward, whereupon the liquid flows through the openings in the bottom of the cell and fills the latter to an extent proportionate to the depth which the cell itself is moved. This done, the valves are operated to close the openings in the bottom of the cell, and the latter is lifted bodily up and away from the liquid, and, the cell being, of course, provided with the usual zinc, carbons, connections, &c., is then ready for use. When it is desired that the battery shall, for the time being, cease to be operative, the valves are again depressed to open the openings in the bottom of the cell and permit the liquid to flow out into the reservoir formed by the lower portion of the vessel, which done, the valves are again brought back to close the openings, and thus prevent the entrance of the liquid into the cell, even when the entire apparatus is turned over or inverted. The apparatus is therefore capable of being transported without danger of spilling the liquid contents, and also without liability of the liquid finding its way into the cell and putting the latter into active operation when such is not desired. The vessel itself may, when preferred, be furnished with a cover of any appropriate construction.

Figure 2:
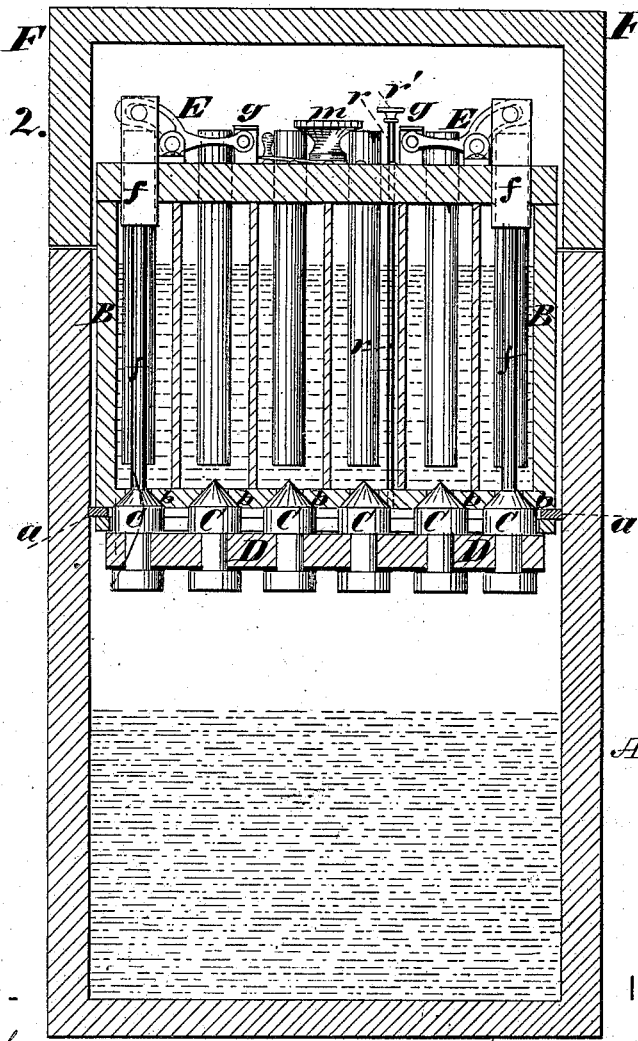

Figure 1 is a plan view, and Fig. 2 a central vertical sectional view, of an apparatus including my said invention.

A is the vessel, which may be of square, cylindrical, or other suitable shape, and B is the battery-cell, of corresponding form, but of a size which permits it to slide vertically within the vessel A. Around the lower portion of the circumference of the battery-cell is provided a packing, $a$, designed to prevent the passage or leakage of liquid between the sides of the cell and the vessel. It is, of course, to be understood that both the cell and the vessel are to be made of materials—such, for example, as vulcanized india-rubber—which will be practically proof against the corrosive action of the exciting-liquid used in the battery, which said exciting-liquid may be of the usual or any suitable kind. The battery-cell B is, of course, to be provided with the usual zinc, carbons, connections, &c.; but as these may be of any ordinary or appropriate variety, they need no special description here.

In the bottom of the cell B are any desired number of holes or openings, $b$. These holes or openings may be of flaring or conical form, as represented in Fig. 2. Each of these openings is fitted from underneath with a valve, C. These valves C are all arranged upon a bar, D, and from the two valves at the ends of this bar extend upward the rods $f$. The upper ends of these rods $f$ are connected with levers E, so that when the levers are moved in one direction the valves will be brought snugly up into or against the holes or openings $b$ in the bottom of the cell, and effectually close the same, the levers themselves being locked in position by spring-catches $g$, or other suitable devices, to retain the valves in position. On the other hand, when the levers are moved in the opposite direction the valves are lowered to open the holes or openings b.

The normal position of the cell is in the upper part of the vessel A, the lower part of the latter constituting a reservoir, in which is placed the exciting-liquid for the battery-cell.

When it is desired to charge the battery-cell in order to set the same in operation for battery purposes, the valves are lowered, as just hereinbefore explained, and the cell itself is forced downward bodily into the liquid in the lower part of the vessel A to any depth desired, the liquid flowing upward through the openings b to fill the battery-cell to the extent required. This being done, the valves are operated to close the openings b, and then, by means of a knob or handle, n, the battery-cell is lifted bodily to the upper part of the vessel A, the contained portion of the liquid being held within the cell by the closure of the openings b by means of the valves C, the battery-cell being thus fitted for active operation for battery purposes.

When it is desired that the operation of the battery-cell shall cease the valves are operated to open the openings b, and thereby permit the liquid to flow out from the cell into the reservoir provided underneath by the lower portion of the vessel A. This done, the valves are again brought upward to again close the openings b, and inasmuch as the valves then prevent the entrance of the liquid into the cell, and the packing a prevents the liquid from passing between the sides of the cell and the vessel, it follows that the liquid will be confined within the aforesaid reservoir, and that, even if the apparatus be turned on its side or inverted, there would be no danger either of spilling the liquid or of setting the battery-cell in operation when not required.

The apparatus may be furnished, when desired, with a cover, F, to protect the otherwise exposed parts attached to the battery-cell.

In order to avoid the formation of a vacuum beneath the battery-cell when the latter is lifted, as hereinbefore explained, a small air-vent tube, r, is provided to the battery-cell, the lower end opening into the space below the said cell, and the upper end closed by a suitable screw cap or plug, r', which is, of course, to be removed before the cell is lifted.

What I claim as my invention is—

1. In a portable galvanic battery, the vessel A and the internally-arranged sliding battery-cell B, provided with packing a or other suitable means of maintaining a tight joint between the exterior of the cell and the internal surface of the vessel, substantially as and for the purpose herein set forth.

2. A battery-cell constructed with one or more openings, b, in its lower part, in combination with a valve or valves, C, so as to close and open the aforesaid openings, and an external vessel, A, within which the cell is capable of a sliding motion, and the lower part of which constitutes a reservoir for liquid, all substantially as and for the purpose herein set forth.

3. The combination of the vessel A, having its lower part arranged to provide a reservoir for liquid, the battery-cell B, constructed with the packing a, an opening or openings, b, and, placed to slide within said vessel A, a valve or valves placed to close the opening or openings b, a rod or rods, f, and a lever or levers, E, the whole constructed and arranged for use and operation substantially as and for the purpose herein set forth.

4. A portable galvanic battery composed of the vessel A, a sliding battery-cell, B, having the packing a and the openings b, the valves C, placed upon the bar D, the rods f, and the levers E, the whole constructed, combined, and arranged for use and operation substantially as and for the purpose herein set forth.

SAMUEL H. BARTLETT.

Witnesses:
CHAS. H. DOXAT,
H. F. PARKER.